United States Patent
Kolsky

[11] Patent Number: 5,274,846
[45] Date of Patent: Jan. 4, 1994

[54] CUSHION HAVING MULTILAYER CLOSED CELL STRUCTURE

[75] Inventor: Rodger E. Kolsky, Schenectady, N.Y.

[73] Assignee: HPI Health Protection, Inc., Schenectady, N.Y.

[21] Appl. No.: 738,855

[22] Filed: Jul. 31, 1991

Related U.S. Application Data

[63] Continuation-in-part of Ser. No. 537,086, Jun. 12, 1990, Pat. No. 5,034,998.

[51] Int. Cl.⁵ .................................................. A41D 13/00
[52] U.S. Cl. .................................................. 2/2; 2/16; 2/22; 2/20; 2/267; 428/316.6; 428/313.5; 428/314.2; 428/314.4; 428/159; 428/172; 5/448; 5/455; 5/417; 5/466
[58] Field of Search ................... 2/2, 16, 22, 268, 413, 2/267, 92, 161; 428/316.6, 313.5, 314.2, 314.4, 159, 172; 5/436, 448, 455, 417, 434, 466; 206/521, 522, 523

[56] References Cited

U.S. PATENT DOCUMENTS

| | | | |
|---|---|---|---|
| 2,247,961 | 7/1941 | Mulvey . | |
| 2,481,291 | 9/1949 | Coleman . | |
| 2,851,390 | 9/1958 | Chavannes . | |
| 2,917,051 | 12/1959 | White . | |
| 3,050,734 | 8/1962 | Dopyera | 2/268 |
| 3,185,362 | 5/1965 | Wakefield . | |
| 3,349,990 | 10/1967 | Woodford | 206/521 |
| 3,446,880 | 5/1969 | Enicks . | |
| 3,550,159 | 12/1970 | Alarco . | |
| 3,577,305 | 5/1971 | Hines et al. . | |
| 3,769,145 | 10/1973 | Gresham | 206/521 |
| 3,771,170 | 11/1973 | Leon . | |
| 3,868,056 | 2/1975 | Keren | 206/521 |
| 3,872,511 | 3/1975 | Nichols | 2/413 |
| 4,119,204 | 10/1978 | Peckar | 206/521 |
| 4,147,828 | 4/1979 | Heckel et al. | 428/316.6 |
| 4,167,824 | 9/1979 | Wolpa | 428/316.6 |
| 4,185,327 | 1/1980 | Markve | 2/2 |
| 4,287,250 | 9/1981 | Rudy | 206/522 |
| 4,405,681 | 9/1983 | McEvoy | 428/316.6 |
| 4,538,301 | 9/1985 | Swatzki et al. . | |
| 4,547,919 | 10/1985 | Wang . | |
| 4,559,646 | 12/1985 | Ertl | 2/161 R |
| 4,574,101 | 3/1986 | Tricca et al. | 428/316.6 |
| 4,586,200 | 5/1986 | Poon | 2/413 |
| 4,602,384 | 7/1986 | Schneider . | |
| 4,700,403 | 10/1987 | Vacanti | 2/267 |
| 4,737,994 | 4/1988 | Galton . | |
| 4,754,858 | 7/1988 | Robinson | 2/20 |
| 4,773,534 | 9/1988 | Deheras | 206/522 |
| 4,807,301 | 2/1989 | Ferber . | |
| 4,884,295 | 12/1989 | Cox . | |
| 4,926,503 | 5/1990 | Wingo | 2/2 |
| 5,007,111 | 4/1991 | Adams | 2/2 |
| 5,010,988 | 4/1991 | Brown | 206/521 |
| 5,099,991 | 3/1992 | Kitagawa et al. | 206/522 |
| 5,110,653 | 5/1992 | Landi | 206/521 |
| 5,143,775 | 9/1992 | Olsson et al. | 206/522 |

FOREIGN PATENT DOCUMENTS

| | | | |
|---|---|---|---|
| 63435 | 2/1914 | Austria | 2/2 |
| 153082 | 6/1985 | European Pat. Off. | 2/2 |
| 0351147 | 7/1989 | European Pat. Off. | 2/2 |
| 2703538 | 11/1977 | Fed. Rep. of Germany | 2/2 |
| 3530397 | 5/1987 | Fed. Rep. of Germany | 2/2 |

*Primary Examiner*—Clifford D. Crowder
*Assistant Examiner*—Gloria Hale
*Attorney, Agent, or Firm*—R. Neil Sudol; Henry D. Coleman

[57] ABSTRACT

A cushion or pad comprises a first layer of a first synthetic cellular material having a first average cell volume and a second layer of a second synthetic cellular material having a second average cell volume at least ten times greater than the first average cell volume. The first layer is attached to the second layer so that the first layer and the second layer at least partially overlap one another to form a multilayer structure. The layer with the larger average cell volume is a polymeric sheet with at least a substantially planar array of fluid-filled pockets or chambers. The layer with the smaller average cell volume is a foam material with either open cells or closed cells. Further layers of fluid-filled chambers or foam material may be attached to the first two layers.

24 Claims, 5 Drawing Sheets

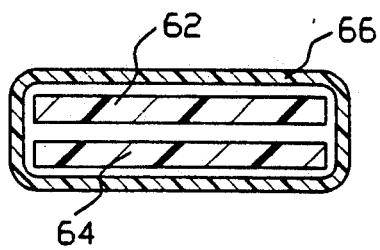
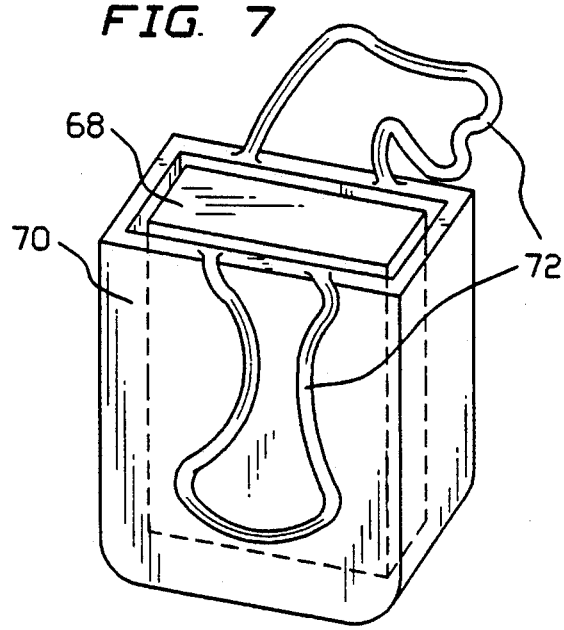
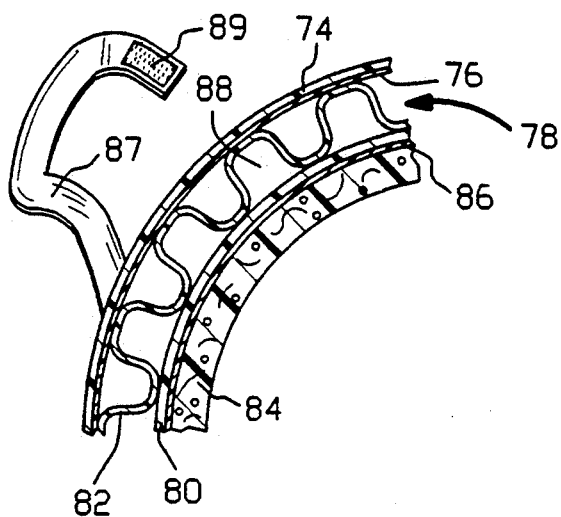
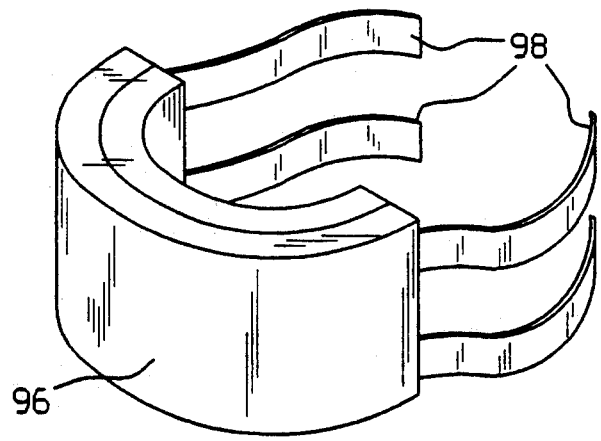
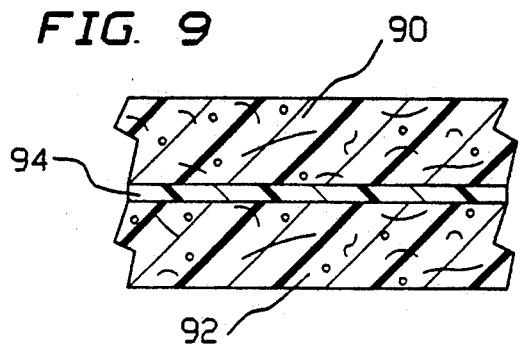

CUSHION HAVING MULTILAYER CLOSED CELL STRUCTURE

CROSS REFERENCE TO A RELATED APPLICATION

This application is a continuation-in-part of commonly owned application Ser. No. 537,086 filed Jun. 12, 1990, now U.S. Pat. No. 5,034,998.

BACKGROUND OF THE INVENTION

This invention relates to a cushion or pad. More particularly, this invention relates to a cushion or pad made of a composite material.

Various cushioning and energy-absorbing materials have been used to reduce injury from impact, such as rubber, cellular foams and air-inflated cushions. All of these products reduce the energy transmission from impact or impart some comfort factor such as cushioning materials or mats.

As a rule, the absorbing material is a homogeneous material of a finite thickness. High-density foams will absorb more energy than low-density foams but are heavier and significantly more expensive and more difficult to bend, shape or contour.

In many cases, it is necessary to compromise by using a higher-density material which is more resistant to deformation than a low-density product, at the cost of presenting a less forgiving surface to the body contacting the material. If one attempts to offset the deficiency of a softer and lower-density material, substantial thickness increases are required to offset the deficiencies of the material.

OBJECTS OF THE INVENTION

An object of the present invention is to provide an improved cushion or pad.

Another object of the present invention is to provide a cushion or pad with improved shock-absorbing characteristics.

A more particular object of the present invention is to provide a protective cushion which can absorb more energy or distribute it more uniformly.

A related object of the present invention is to provide a cushion or pad which offers substantially better support and/or better energy absorption than conventional cushioning material of equivalent thickness.

An additional object of the present invention is to provide a cushion or pad which can be used in a multitude of different applications and, more specifically, can be worn on the body to protect localized areas such as the leg, the elbow, etc.

A further particular object of the present invention is to provide a cushion or pad which is light weight and resilient, yet strong and supporting.

Yet another particular object of the present invention is to provide a cushion or pad which is easy and inexpensive to fabricate.

SUMMARY OF THE INVENTION

A cushion or pad comprises, in accordance with the present invention, a first layer of a first synthetic cellular material having a first average cell volume and a second layer of a second synthetic cellular material having a second average cell volume at least ten times greater than the first average cell volume. The first layer is attached to the second layer so that the first layer and the second layer at least partially overlap one another to form a multilayer structure.

Pursuant to another feature of the present invention, the second synthetic cellular material is a flexible polymeric material provided with an array of closed fluid-filled chambers. In addition, the first synthetic cellular material is preferably a foam material having open cells or closed cells.

A third layer of a foam material may be attached to either the first layer or the second layer. Like the first layer, the third layer may have an open-cell or a closed-cell construction.

Pursuant to a further feature of the present invention, the first layer and the second layer are attached to one another by an envelope which contains the two layers and thereby holds them in proximity to one another.

The cushion or pad may additionally comprise a cover member with a pocket. In that event, the first layer and the second layer are removably inserted in the pocket. The cover member is advantageously provided with hand grips so that it functions as a tote bag.

An alternative means of attaching the two cellular layers to one another takes the form of a layer of bonding material. As yet another alternative, the first layer and the second layer are attached to one another via heat seals or welds.

Where the second layer takes the form of an array of fluid-filled chambers, the array is preferably a two-dimensional array.

Pursuant to yet another feature of the present invention, the cushion also comprises a third layer of essentially hard material and means for securing the first layer and the second layer to the hard layer. The cellular layers may be connected to the hard layer on opposite sides thereof. Alternatively, the cellular layers may be connected to one another, the hard layer being fastened directly to only one of the cellular layers. The hard layer is preferably in a form molded to conform to a body part of a person. Such a combination is utilizable as a protective device in sports activities.

Pursuant to yet another protective purpose of the present invention, the cushion is provided with fasteners for enabling a temporary securing of the cushion to a person's body.

In accordance with a specific embodiment of the invention, the multilayer structure includes a smooth surface. The smooth surface may carry at least one game board which is attached via a decal or printed on the smooth surface of the multilayer structure.

According to another embodiment of the present invention, a cushion or pad comprises one layer of a polymeric material provided with an array of closed fluid-filled chambers and another layer of a cellular foam material. The two layers are attached to one another so that they at least partially overlap one another to form a multilayer structure.

In an additional embodiment of the present invention, a cushion comprises a layer of a synthetic cellular material having open cells and an attached layer of a synthetic cellular material having closed cells.

A cushion in accordance with yet another embodiment of the present invention comprises two layers of synthetic cellular materials attached to one another and an envelope with a pocket, the two layers being removably inserted in the pocket. The envelope is provided with graspable members such as straps or loops for enabling a manual carrying of the envelope in suspension.

A mat comprises, in accordance with the present invention, a first layer of a first synthetic cellular material and a second layer of a second synthetic cellular material attached to one another. A third layer defining a smooth surface is provided with a plurality of printed game boards, the third layer being fastened to one of the first layer and the second layer.

A cushion or pad pursuant to the instant invention has improved shock-absorbing characteristics. It can absorb more energy or distribute it more uniformly than conventional cushions and can therefore serve as a protective cushion. More specifically, a pad or cushion pursuant to the invention offers substantially better support and/or better energy absorption than conventional cushioning material of equivalent thickness.

A cushion or pad in accordance with the invention is light weight and resilient, yet strong and supporting. Moreover, it is easy and inexpensive to fabricate.

A cushion, pad or mat in accordance with the present invention has a broad range of uses including knee pads and shin guards, exercise mats, beach pads, stadium seat cushions, wheelchair cushions, and bathtub liners. In addition, the cushion may be used in luggage handles and pads for shoulder straps. The multilayer cushion material may also be used as a liner material for gloves, for example, as padding in a baseball glove or along the fingers of a glove. In the case of a shin guard, two or more layers of fluid-filled polymeric cellular materials can be bonded or otherewise attached to each other and fixed to the body with hook-and-loop-type fasteners (e.g., VELCRO). As the cushion receives an impact, the different layers compress differently to absorb and distribute the impact energy.

In the application of seating cushions, exercise mats, beach pads, etc., polymeric foam material is layered with a fluid-filled polymeric cellular material in one or more layers to provide firm, yet comfortable, support arising from the different compression characteristics of the different cellular materials.

A particular multilayer product in accordance with the invention comprises a layer of the Dow Company's ETHAFOAM 221 bonded to a layer of Polyair Corporation's solar pool cover material.

BRIEF DESCRIPTION OF THE DRAWING

FIG. 6 is a partial cross-sectional view of a further multilayer cushion in accordance with the present invention.

FIG. 7 is a schematic perspective view of a tote bag with a cushion, in accordance with the present invention.

FIG. 8 is a partial cross-sectional view of an additional multilayer cushion in accordance with the present invention, showing a hard preformed shell and a strap for attaching the cushion to a person.

FIG. 9 is a partial cross-sectional view of yet another multilayer cushion in accordance with the present invention.

FIG. 10 is a schematic perspective view of a cushioning device for attachment to a body part, in accordance with the present invention.

DETAILED DESCRIPTION

Figure 1:
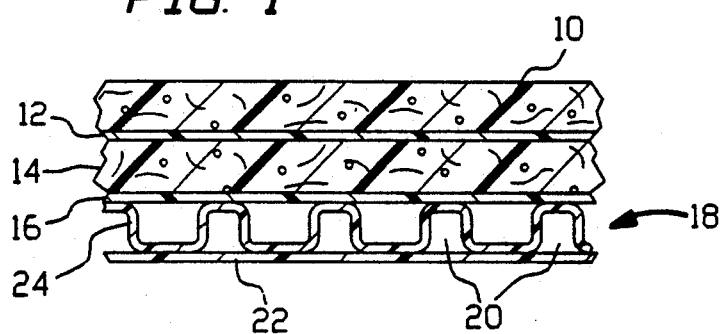
FIG. 1 is a partial cross-sectional view of a multilayer cushion in accordance with the present invention.

As illustrated in FIG. 1, a cushion or pad comprises a first layer 10 of a polymeric foam material of either open cell or closed cell construction. That first layer 10 is bonded via a layer 12 of adhesive, heat welds or ultrasonic welds to a second layer 14 of a polymeric foam material of either open cell or closed cell construction. The polymeric material of layers 12 and 14 may have the same molecular structure, e.g., polyethylene or polyvinyl chloride or polypropylene, but it is advantageous in some applications to have one layer 12 or 14 of open cell construction and the other layer 14 or 12 of closed cell construction.

Figure 2:
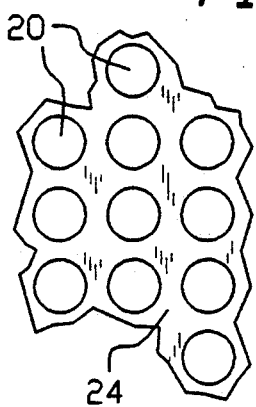
FIG. 2 is a partial top view of a bubble-wrap-type layer of the cushion of FIG. 1.

The second layer 14 is bonded via a layer 16 of adhesive, heat welds or ultrasonic welds to a layer of sheet material 18 having a multiplicity of cylindrical fluid-filled pockets or chambers 20 disposed in a planar array (see FIG. 2). Sheet material 18 specifically comprises, as depicted in detail in FIG. 1, a backing web 22 of air-impermeable polymeric material such as polyethylene, polyvinyl chloride or polypropylene to which a bubble layer 24 is adhesively or ultra-sonically bonded.

For many applications it is contemplated that layer 10 may be omitted from the cushion of FIG. 1. Basically, then, a cushion comprises a layer 14 of a polymeric foam material of either open cell or closed cell construction bonded to a layer of sheet material 18 having a multiplicity of cylindrical fluid-filled pockets or chambers 20. xxx As illustrated in FIG. 2, chambers 20 are disposed in a regular array. Alternatively, as described in U.S. Pat. No. 5,034,998, the disclosure of which is hereby incorporated by reference herein, chambers 20 may have a varying size and distribution selected in accordance with the expected forces experienced by different areas of sheet 18. More particularly, in the event that the multilayer material is used as or in a protective device for a human being, those areas of sheet 18 juxtaposed to projecting bone parts are expected to encounter elevated magnitudes of force owing to the absence of natural padding at those areas. Accordingly, such areas of expected elevated forces are preferably designed to absorb and dissipate greater shocks. As shown in U.S. Pat. No. 5,034,998, a high density of relatively small bubbles or chambers is believed better suited to accomodate the elevated force magnitudes. The small bubbles may be interspersed, however, with larger bubbles, whereby several stages of shock absorption and dissipation may be effectuated.

Figure 3:
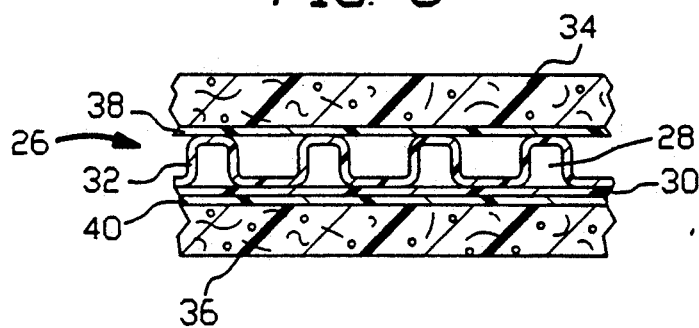
FIG. 3 is partial cross-sectional view of another multilayer cushion in accordance with the present invention.

As depicted in FIG. 3, another multilayer cushion comprises a middle layer of sheet material 26 having a multiplicity of cylindrical fluid-filled pockets or chambers 28 disposed in a planar array (see FIG. 2). Sheet material 26 specifically comprises, as depicted in detail in FIG. 3, a backing web 30 of air-impermeable polymeric material such as polyethylene, polyvinyl chloride or polypropylene to which a bubble layer 32 is adhesively or ultra-sonically bonded. The multilayer cushion of FIG. 3 further comprises two outside layers 34 and 36 of polymeric foam material of either open cell or closed cell construction attached to sheet material 26 on opposite thereof via respective layers 38 and 40 of adhesive, heat welds or ultrasonic welds.

Figure 4:
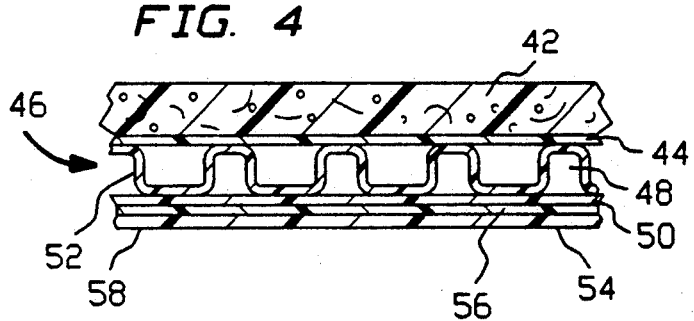
FIG. 4 is a partial cross-sectional view of yet another multilayer cushion in accordance with the present invention.

As illustrated in FIG. 4, a multilayer cushion or pad comprises a layer 42 of a polymeric foam material of either open cell or closed cell construction. Foam layer 42 is bonded via an adhesive or weld layer 44 to a layer of fluid-filled sheet material 46 having a multiplicity of cylindrical fluid-filled pockets or chambers 48 disposed in a planar array (see FIG. 2). Sheet material 46 specifically comprises a backing web 50 of air-impermeable polymeric material such as polyethylene, polyvinyl chloride or polypropylene to which a bubble layer 52 is adhesively or ultra-sonically bonded. The multilayer cushion of FIG. 4 also comprises an outer layer or web 54 of polymeric material such as polyethylene, polyvinyl chloride or polypropylene attached to bubble sheet 46 via an adhesive or weld layer 56 or via other fastening means such as hook and loop strips (VELCRO)(not illustrated).

Figure 5:
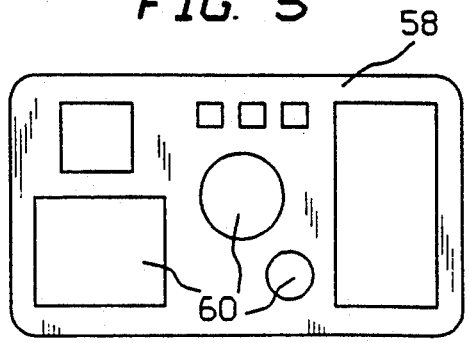
FIG. 5 is a top view of a pad or mat using the multilayer cushion material of FIG. 4, showing printed matter on a smooth surface of the pad or mat.

As shown in FIG. 5, an outer, smooth, surface 58 of web 54 may be printed with a multiplicity of game boards 60. Alternatively, outer layer or web 54 may be a decal carrying the game boards 60. Accordingly, the cushion, pad or mat of FIGS. 4 and 5 may be used as a multipurpose support, for example, at a beach. Players using one or more of the game boards 60 may sit on the pad or mat while playing one or more of the games. It is to be understood that game boards 60 may take the form of outlines for games such as maze-type games.

As shown in FIG. 6, another cushion or pad includes a pair of polymeric cellular layers 62 and 64 enclosed and held in juxtaposition to one another by an envelope or cover 66. Polymeric cellular layers 62 and 64 may each take the form of a closed cell or open cell foam material. Alternatively, one of the layers 62 or 64 may take the form of a bubble-wrap-type sheet material similar or identical to sheets 18, 26, 46 (FIGS. 1, 3, 4, respectively). In the cushion or pad of FIG. 6, the different polymeric cellular layers 62 and 64 are attached to one another via envelope 66.

As depicted in FIG. 7, a multilayer cushion or pad 68 as described herein (FIGS. 1, 3, 4, 6, 7) is inserted into a pocket of a bag 70 provided with a pair of handles or grips 72 for facilitating a carrying of the bag in a suspended state. Bag 70 with cushion insert 68 may be used as a seat without removing the cushion. Alternatively, cushion or pad 68 may be removed from bag 70 for separate use.

FIG. 8 illustrates a multilayer cushion or pad which includes a hard exterior shell 74 form molded to conform to a body part of a person. An adhesive or weld layer 76 serves to attach a layer of sheet material 78 to shell 74. Sheet material 78 includes a backing web 80 and a bubble layer 82 bonded thereto. A polymeric foam layer 84 is attached to backing layer 80 via an adhesive or weld layer 86. As discussed hereinabove, fluid-filled chambers 88 of sheet material 78 may have a varying size and distribution selected in accordance with the expected forces experienced by different areas of sheet 78. Those areas of sheet 78 juxtaposed to projecting bone parts are preferably designed to absorb and dissipate greater shocks and may therefore incorporate a high density of relatively small bubbles or chambers.

A strap 87 attached to shell 74 is provided with a connector element 89 such as a VELCRO strip for facilitating the atachment of the cushion or pad of FIG. 8 to a person's elbow, shin, or other body part.

As illustrated in FIG. 9, another multilayer cushion or pad includes a pair of polymeric cellular layers 90 and 92 bonded to one another by an adhesive or weld layer 94. Layer 90 is made of a foam material of open cell construction, while layer 92 is made of a foam material of a closed cell construction.

Any of the multilayer cushions or pads discussed hereinabove may be temporarily fastened to a person for protective purposes. As shown in FIG. 10, a multilayer cushion or pad 96 is provided with a multiplicity of straps, ties or connectors 98 (e.g., VELCRO strips) for facilitating a temporary securing of the cushion or pad to a body part of a person.

Figure 11:
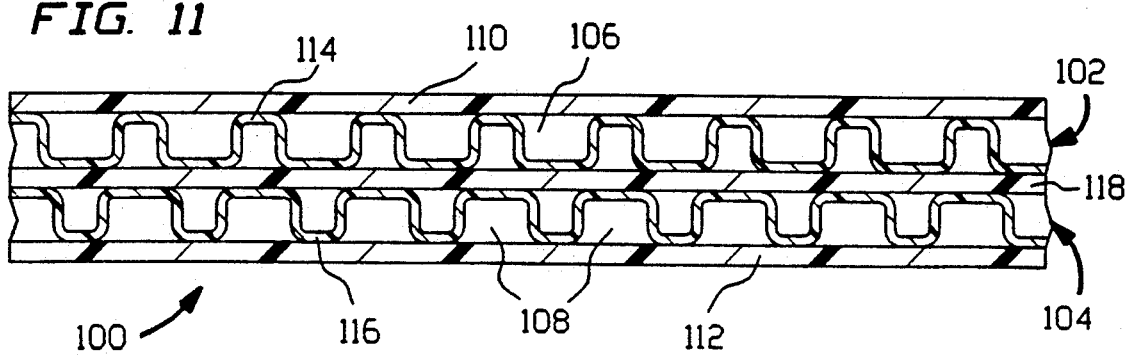
FIG. 11 is a partial cross-sectional view of a fluid-filled sheet member for use in a multilayer cushion in accordance with the present invention.

As depicted in FIG. 11, a bubble-wrap-type sheet material 100 usable in any of the cushions or pads of FIGS. 1, 3, 4, 6, 7, 8, or 10 may comprise two layers 102 and 104 of bubbles or fluid filled chambers 106 and 108. Each layer 102 and 104 is formed by a respective web 110 and 112 of polymeric material bonded to a respective bubble film 114 and 116. The two layers are separated by an additional web 118 to which bubble films 114 and 116 may be bonded by the application of adhesive, heat treatment or ultrasonic energy.

Figure 12:
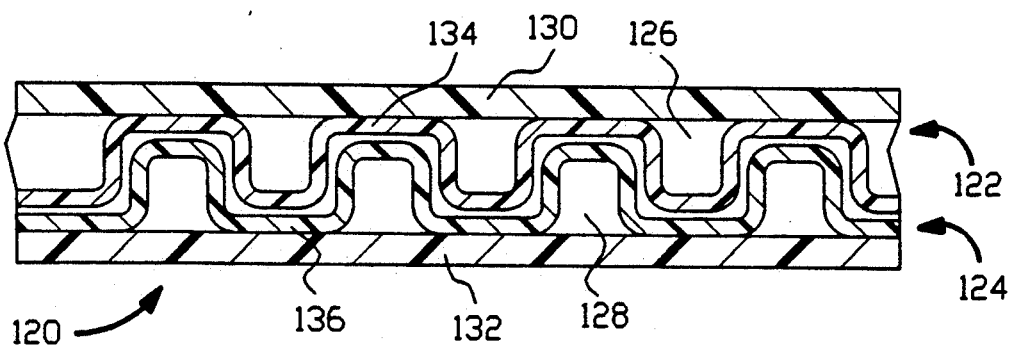
FIG. 12 is a partial cross-sectional view of another fluid-filled sheet member for use in a multilayer cushion in accordance with the present invention.
Figure 13:
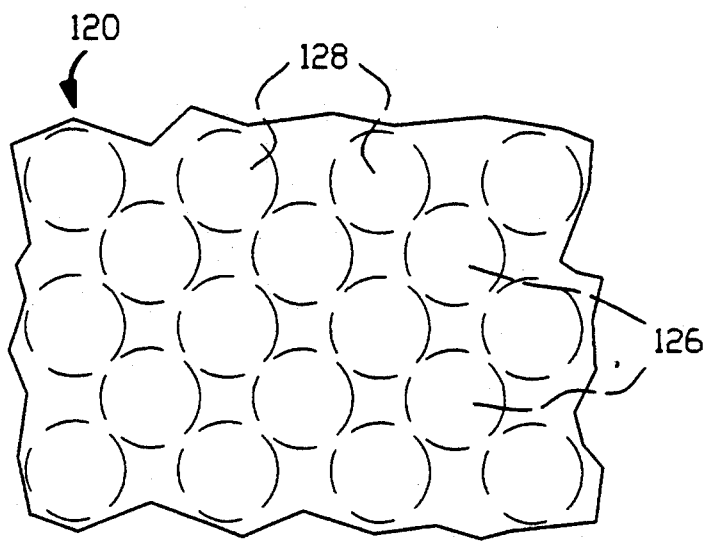
FIG. 13 is a top view of the sheet member of FIG. 12.

As illustrated in FIGS. 12 and 13, another enhanced protective sheet material 120 utilizable in a fall protection device in accordance with the present invention includes two layers 122 and 124 of bubbles or fluid filled chambers 126 and 128. Each layer 122 and 124 is formed by a respective web 130 and 132 of polymeric material bonded to a respective bubble film 134 and 136. Bubble layers 122 and 124 are staggered with respect to one another so that the chambers 126 of bubble layer 122 are disposed in the interstices between chambers 128 of bubble layer 124 and conversely chambers 128 of bubble layer 124 are disposed in the interstices between chambers 126 of bubble layer 122.

The two-layered sheet materials 100 and 120 of FIGS. 11-13 increase the effectiveness of cushioning devices in accordance with the present invention. The double layered sheet material increases the shock absorption and kinetic energy dissipation capability of the devices. Accordingly, the use of double layers is especially indicated in areas of hard impacts.

Figure 14:
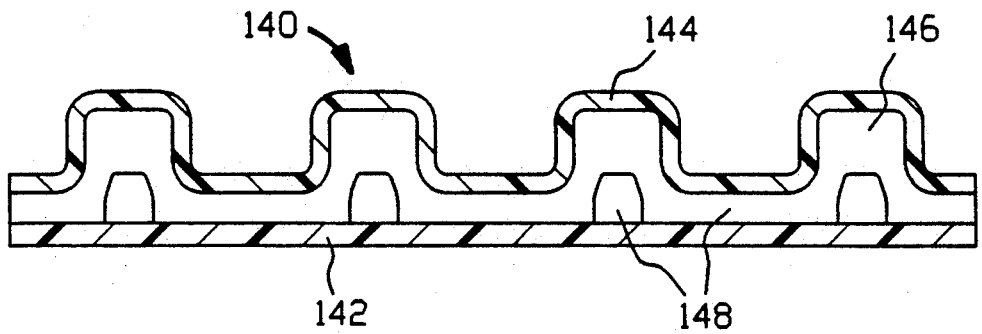
FIG. 14 is a partial cross-sectional view of yet another fluid-filled sheet member for use in a multilayer cushion in accordance with the present invention.
Figure 15:
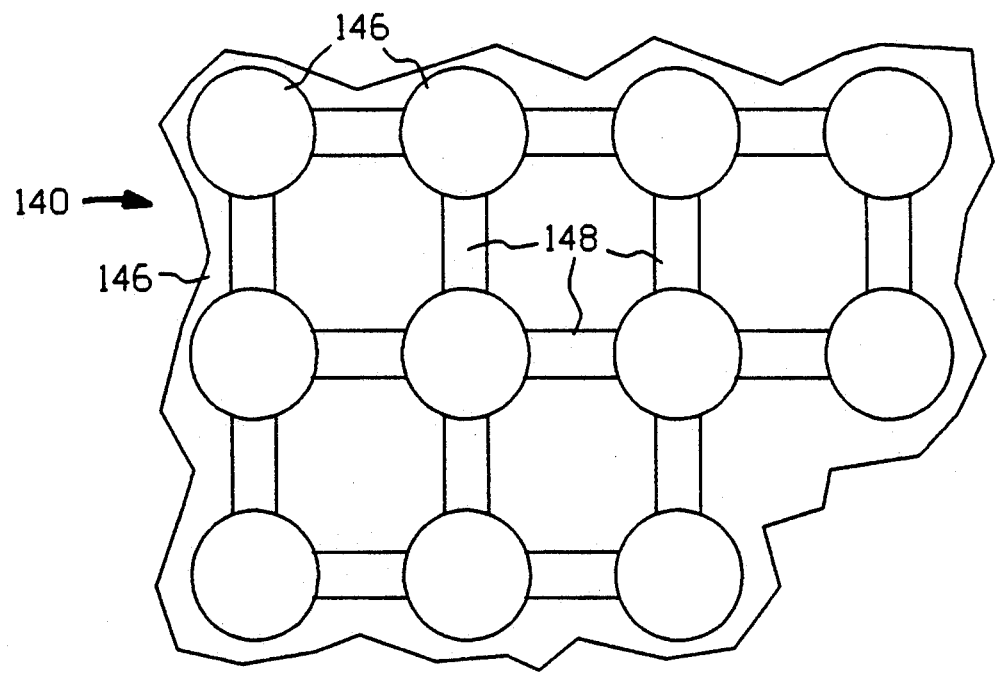
FIG. 15 is a top view of the sheet member of FIG. 14.

As illustrated in FIGS. 14 and 15, another sheet material 140 for use in any of the cushions or pads of FIGS. 1, 3, 4, 6, 7, 8, or 10 includes a first web 142 of polymeric material bonded to a second web 144 formed with a multiplicity of fluid filled bubbles or chambers 146. In contrast to the fluid filled chambers of FIGS. 11-13, chambers 146 are not discrete but are rather connected to one another via a network of channels 148. Upon the application of external pressure to sheet material 140, for example, in the course of a fall of a person wearing a cushioning device incorporating sheet material 140, fluid (e.g., air) is forced through channels 148, thereby providing resistance to the force and dissipating the force by the movement of the fluid.

Of course, it is not necessary for all of the chambers 146 to be connected to one another. Some chambers 146 may remain discrete, while others communicate with each other via channels 148.

The fluid filled chambers of the bubble-wrap layers in the cushions or pads described herein may be provided with rupturable walls. More particularly, the chambers have walls of different thicknesses and different strengths, for rupturing upon application of different magnitudes of force.

Although air is the preferred fluid with which the shock-absorbing chambers are filled, it is of course possible to use other gases or even liquids. More particularly, some or all of the pockets or chambers in areas of high impact expectancy may be filled with a liquid such as water, while other chambers, spaced from the higher danger zones, are preferably filled with air.

Tint may be applied to the fluid filling the chambers. Thus, upon rupture of a chamber and the escape of the enclosed fluid, the chamber changes color and thereby alerts a user or supervisory personnel to the lowered protection available from the particular fall protection device.

It is to be noted that the fluid-filled chambers of the bubble wrap layers have average cell volumes at least ten times as large as the average cell volumes of the adjacent foam layers. Thus, the average cell volume of chambers 20 of sheet material 18 in FIG. 1 are at least ten, times the average cell volumes of the cells of foam layers 10 and 12.

The difference in relative volumes of the bubble layers and the foam layers is necessary to provide adequate cushioning in response to encountered objects of different sizes and textures. Where the average cell sizes of two cushioning layers differ sufficiently, e.g., by a factor of at least ten, shocks which will penetrate one layer will be absorbed or dissipated by the other layer. If the cellular volumes of different cushioning layers are not sufficiently different, for example, if the average cellular volumes of two layers differ by less than a factor of ten, then the cushioning effect does not extend appreciably beyond the ranges of size and texture cushioned by either layer singly. In addition, an initial dissipation of kinetic energy or impact forces by a first layer is enhanced in another stage by an adjacent layer with cells or chambers having an average cell volume substantially different from the average cell volume of the first layer.

Figure 16:
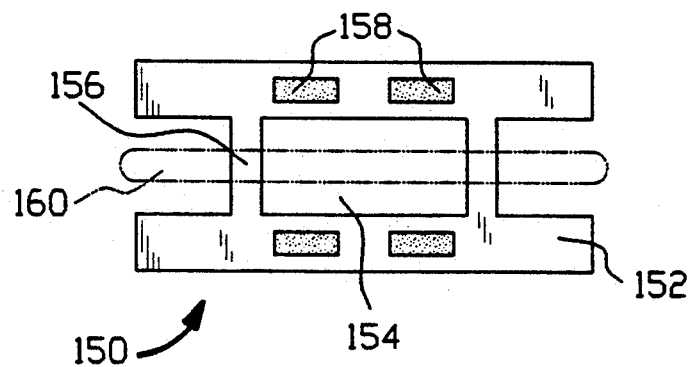
FIG. 16 is a top plan view of a removable hand grip cushion in accordance with the present invention.

As illustrated in FIG. 16, a hand grip attachment 150 includes a body member 152 in the form of an H, a pad 154 attached to the cross-bar 156 of the H-shaped body member 152, and a plurality of VELCRO hook and loop fasteners 158 for enabling a releasable coupling of the grip attachment to a suitcase handle 160. Alternatively, pad 154 may be coextensive with H-shaped body member 152 or may itself form the body member.

Figure 17:
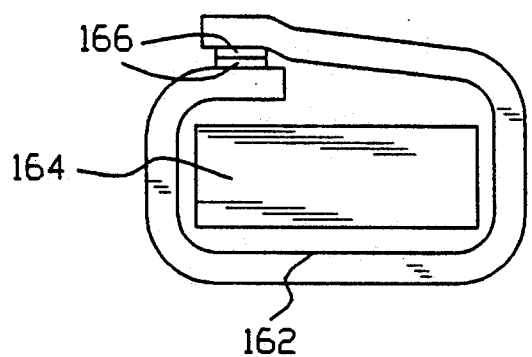
FIG. 17 is a schematic cross-sectional view of a pad for a shoulder strap, in accordance with the invention.

FIG. 17 shows a strip 162 of cushioning material as described hereinabove with reference to FIGS. 1-4, 9 and 11-5. Strip 162 is rolled into a cylinder about a valise strap 164. The rolled or cylindrical configuration of strip 162 is maintained by at least two cofunctioning VELCRO hook and loop fasteners 166.

Figure 18:
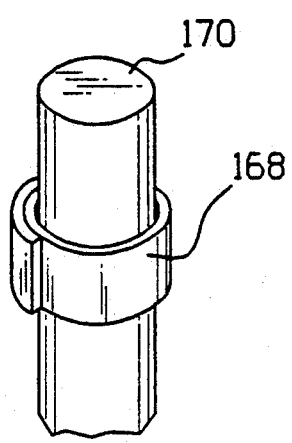
FIG. 18 is a schematic perspective view of a bumper cushion attached to a docking post, in accordance with the present invention.

FIG. 18 depicts a strip 168 of cushioning material as described hereinabove with reference to FIGS. 1-4, 9 and 11-5. Strip 168 is rolled into a cylinder about a docking post 170. The rolled or cylindrical configuration of strip 168 is maintained by cooperating VELCRO hook and loop fasteners (not illustrated).

Figure 19:
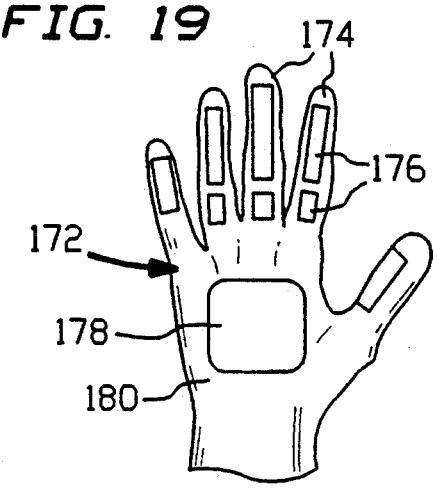
FIG. 19 is a schematic plan view of a glove provided with cushioning material in accordance with the present invention.

FIG. 19 shows a glove 172 provided along at least one of its fingers 174 with one or more pads 176 of multilayer cushioning material as described hereinabove with reference to FIGS. 1-4, 9 and 11-5. An additional pad 178 of similar multilayer material is provided in the palm area 180 of glove 172. Pads 176 and 178 may be attached to an outer surface of glove 172 or may be disposed inside the glove. The pads may be bonded or sewn to the body of the glove. Glove 172 can be a work glove for the performance of manual labor or a sports glove, e.g., a baseball glove.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proferred by way of example to facilitate comprehension of the invention and should not be construed to limit the scope thereof.

What is claimed is:

1. A cushion comprising:
    a first layer of a synthetic cellular material having an average cell volume;
    a second layer of a flexible polymeric material provided with an array of closed fluid-filled chambers having an average volume at least ten times greater than said average cell volume; and
    means for attaching said first layer to said second layer so that said first layer and said second layer at least partially overlap one another to form a multilayer structure.

2. The cushion set forth in claim 1 wherein said cellular material is a foam material.

3. The cushion set forth in claim 2, further comprising a third layer of a foam material attached to at least one of said first layer and said second layer.

4. The cushion set forth in claim 3 wherein the foam material of at least one of said first layer and said third layer has open cells.

5. The cushion set forth in claim 3 wherein the foam material of at least one of said first layer and said third layer has closed cells.

6. The cushion set forth in claim 2 wherein said means for attaching includes an envelope which contains said first layer and said second layer.

7. The cushion set forth in claim 2 wherein said foam material has closed cells.

8. The cushion set forth in claim 2 wherein said foam material has open cells.

9. The cushion set forth in claim 2 wherein said means for attaching includes a layer of bonding material between said first layer and said second layer.

10. The cushion set forth in claim 2 wherein said means for attaching includes heat sealed welds of said first layer and said second layer to one another.

11. The cushion set forth in claim 1 wherein said array of fluid-filled chambers is a two-dimensional array.

12. The cushion set forth in claim 1, further comprising an envelope, said first layer and said second layer being removably inserted into said envelope.

13. The cushion set forth in claim 1, further comprising a cover member with a pocket, said first layer and said second layer being removably inserted in said pocket.

14. The cushion set forth in claim 1, further comprising means for releasably fastening the cushion to a person's body.

15. The cushion set forth in claim 1, further comprising means for releasably fastening the cushion to at least one of a suitcase handle, a boat docking post and a valise shoulder strap.

16. The cushion set forth in claim 1 wherein said multilayer structure is incorporated into a glove.

17. The cushion set forth in claim 1 wherein said multilayer structure includes a smooth surface, further comprising at least one game board printed on said smooth surface.

18. A cushion comprising:
a first layer of a first synthetic cellular material having a first average cell volume;
a second layer of a second synthetic cellular material having a second average cell volume at least ten times greater than said first average cell volume;
means for attaching said first layer to said second layer so that said first layer and said second layer at least partially overlap one another to form a multilayer structure; and
a third layer of essentially hard material and means for securing said first layer and said second layer to said third layer.

19. The cushion set forth in claim 18 wherein said third layer is in a form molded to conform to a body part of a person.

20. A cushion comprising:
a first layer of a polymeric material provided with an array of closed fluid-filled chambers;
a second layer of a cellular foam material having an average cell volume, said closed fluid-filled chambers having an average volume at least ten times greater than said average cellular volume; and
means for attaching said first layer to said second layer so that said first layer and said second layer at least partially overlap one another to form a multilayer structure.

21. The cushion set forth in claim 20, further comprising a third layer of essentially hard material and means for securing said first layer and said second layer to said third layer.

22. The cushion set forth in claim 21 wherein said third layer is in a form molded to conform to a body part of a person.

23. The cushion set forth in claim 20 wherein said foam material has closed cells.

24. The cushion set forth in claim 20 wherein said foam material has open cells.

* * * * *